United States Patent [19]
Chong

[11] 3,843,737
[45] Oct. 22, 1974

[54] ADIABATIC RECYCLE DESIGN FOR EXOTHERMIC HETEROGENEOUSLY CATALYZED REACTIONS

[75] Inventor: Victor M. Chong, Media, Pa.

[73] Assignees: Sun Ventures Inc., St. Davids, Pa.; Teijin Limited, Tokyo, Japan

[22] Filed: Oct. 31, 1973

[21] Appl. No.: 411,536

[52] U.S. Cl. ................................. 260/668 F
[51] Int. Cl. .............................. C07c 15/20
[58] Field of Search ..................... 260/668 F

[56] References Cited
UNITED STATES PATENTS
3,207,801  9/1965  Frilette et al. .......... 260/668 F
3,223,742  12/1965  Eberhardt .............. 260/668 F Primary Examiner—C. Davis
Attorney, Agent, or Firm—George L. Church; Donald R. Johnson; J. Edward Hess

[57] ABSTRACT

In the preparation of 1,5-dimethyltetralin (1,5-DMT) by the catalytic exothermic cyclization of 5-o-tolylpentene-2, a fixed bed reactor is used and 1,5-DMT product is cooled and recycled to the reactor to maintain temperature control.

7 Claims, 1 Drawing Figure

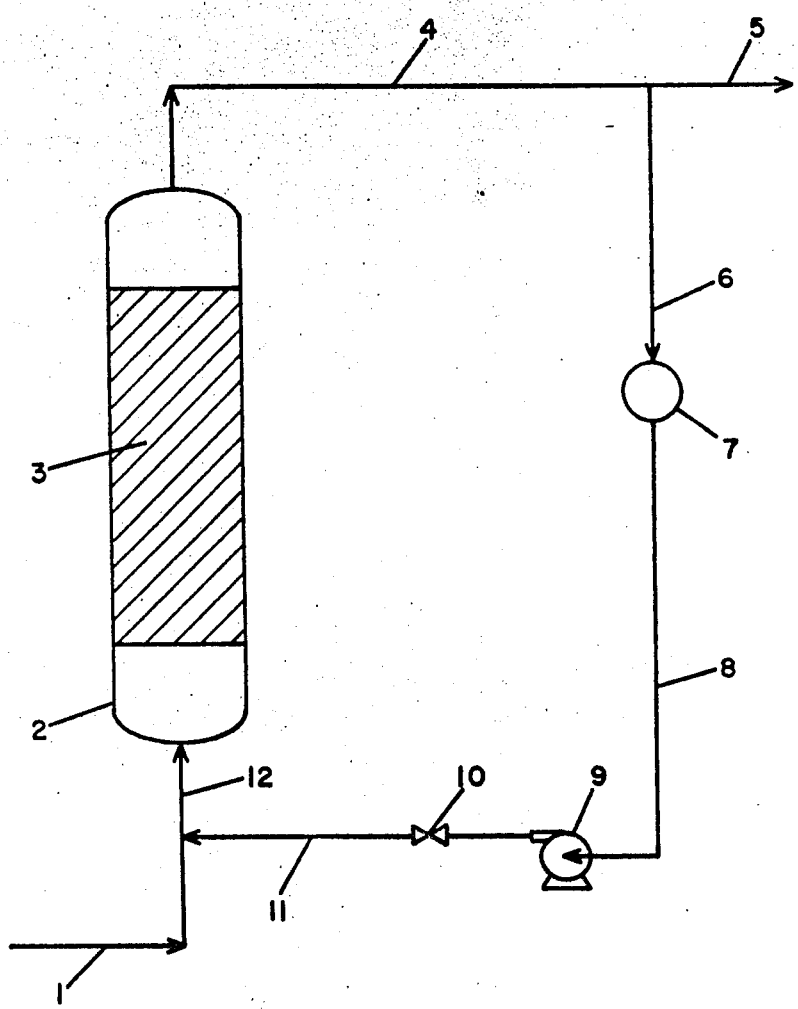

3,843,737

ADIABATIC RECYCLE DESIGN FOR EXOTHERMIC HETEROGENEOUSLY CATALYZED REACTIONS

CROSS REFERENCE TO RELATED APPLICATION

The copending application of Sheldon L. Thompson, Ser. No. 263,731, filed June 9, 1972, now U.S. Pat. No. 3,775,498, and incorporated herein by reference, discloses the preparation of 2,6-dimethylnaphthalene (2,6-DMN) in a plurality of steps including the conversion of 5-o-tolylpentene-2 to 1,5-DMT.

BACKGROUND OF THE INVENTION 2,6-DMN is known to be useful in the preparation of polyesters having outstanding properties. One difficulty in making polyesters from 2,6-DMN is an adequate supply of 2,6-DMN. It is found in various petroleum fractions but only in low amounts relative to the potential market for 2,6-DMN via polyesters. In addition it is found in petroleum in combination with most of the other DMN isomers and isolating the 2,6-isomer is difficult because of close physical properties with certain other isomers. For example 2,6- and 2,7-DMN both have boiling points of 504°F.

The aforesaid Thompson case discloses a synthetic route to 2,6-DMN involving:

1. reaction of o-xylene and butadiene to form o-tolylpentene-2
2. cyclization of o-tolylpentene-2 to 1,5-DMT
3. dehydrogenation of 1,5-DMT to 1,5-DMN
4. isomerization of 1,5-DMN to an isomer mixture including 2,6-DMN
5. separation of 2,6-DMN.

The cyclization of o-tolylpentene-2 to 1,5-DMT is a highly exothermic reaction and would therefore preferably be carried out in a heat exchanger type reactor. Such a reactor contains a plurality of relatively small tubes through which the 5-o-tolylpentene-2 flows under the desired reaction conditions while the space between the tubes is filled with a cooling medium which absorbs the cyclization heat of reaction.

The cyclization reaction requires a catalyst and in the heat exchanger type reactor described above the plurality of small tubes would each be packed with the catalyst. The preferred catalyst for cyclizing 5-o-tolylpentene-2 to 1,5-DMT is supported phosphoric acid.

The above processing scheme, which would normally be employed because of the exothermic nature of the reaction, has several distinct disadvantages in the specific application of converting 5-o-tolylpentene-2 to 1,5-DMT.

One difficulty arises because the cyclization reaction is preferably carried out in liquid phase. For this reason superficial velocities in the reactor will be relatively low and the convective heat transfer rates in a multitube reactor will be relatively low. This then requires a relatively large area reactor which means small tube diameters. A heat exchanger type reactor becomes very expensive with large area and very small tube diameters.

There is also the danger of hot spots in an exothermic reaction combined with the poor heat transfer mentioned above. Hot spots result in by-product formation which is normally the reaction of two moles of 5-o-tolylpentene-2 where the five carbon chain of one molecule attaches to the aromatic ring of another molecule. If the hot spots become hot enough cracking of the 5-o-tolylpentene-2 occurs.

A further problem with the multitube reactor arises with using kieselguhr supported phosphoric acid which is the preferred catalyst. This catalyst tends to soften and swell under the reaction conditions usually employed and this characteristic makes it difficult to clean out spent catalyst from the tube bundle of a heat exchanger type reactor, especially if the tube size is small.

In view of the above, a processing scheme for catalytically converting 5-o-tolylpentene-2 to 1,5-DMT not involving a heat exchanger type reactor would be advantageous.

SUMMARY OF THE INVENTION

According to the invention 5-o-tolylpentene-2 is catalytically converted to 1,5-DMT in a fixed bed adiabatic reactor. Some of the 1,5-DMT product is cooled and is then recycled and mixed with the 5-o-tolylpentene-2 feed to the reactor. This recycling of cooled product is used to control the temperature in the reactor and this eliminates the need for direct cooling in the reactor.

DESCRIPTION OF THE INVENTION

The invention will be described in connection with the FIGURE which is a schematic diagram of one method of carrying out the invention.

Reactor 2 containing catalyst bed 3 is a fixed bed reactor as opposed to a multitube heat exchanger type reactor. It is an adiabatic type reactor in that there is no cooling done within the reactor. There can, of course, be a plurality of beds within the reactor as is often employed in chemical reactions.

The catalyst in reactor 2 is preferably phosphoric acid supported on kieselguhr but any other solid acidic cyclization catalysts can be used, for example those catalysts and supports referred to in the aforesaid Thompson application. The phosphoric acid catalysts available commercially are suitable.

The 5-o-tolylpentene-2 feed flows into the reactor via lines 1 and 12. The feed can be obtained from any source desired but is preferably obtained in the manner described in the aforesaid Thompson application by the reaction of o-xylene with butadiene in the presence of an alkali metal catalyst.

In the absence of any product recycle feed material would enter the reactor at line 12, pass through catalyst bed 3, and 1,5-DMT would be withdrawn as product via lines 4 and 5. Unfortunately in this scheme, if a space rate is selected to give adequate conversion of the feed the temperature in the reactor rises substantially resulting in the formation of substantial quantities of by-product.

In my invention part of the 1,5-DMT product is diverted from line 4 to line 6 where it is cooled by recycle cooler 7. Cooler 7 can be any type of cooling desired such as a multitube heat exchanger, a tank with cooling coils, or the like. The temperature reduction in cooler 7 is described hereafter.

Cooled recycle passes through line 8, pump 9, valve 10 and line 11 and is mixed with incoming 5-o-tolylpentene-2 feed. The recycle-feed mixture enters the reactor through line 12. Valve 10 is the means by which the amount of cooled recycle is controlled.

In the above scheme an excessive temperature rise does not occur. The reason for this is that the amount of fresh feed is reduced, so that less heat is generated, and the heat is absorbed over a larger quantity of material than just the fresh feed. Thus the temperature rise is reduced over what would be achieved in the once through type operation previously described. The recycle material acts as a heat sink.

It will be apparent that the above scheme sacrifices production rate since for any given reactor volume the fresh feed that can be used is reduced by the amount of recycle introduced. In order to achieve the same fresh feed rate a larger reactor must be used. On the other hand, a multitube heat exchanger type reactor is not necessary and the larger fixed bed reactor is much cheaper than the smaller heat exchanger type reactor.

The relative amounts of feed and recycle, the temperatures of each, the amount of cooling in cooler 7, the temperature rise in reactor 2, etc., cannot be specified exactly because they are interrelated with each other. However the following description is adequate to enable those skilled in the art to practice the invention in a most efficacious manner.

The temperature of the feed (feed being fresh feed plus recycle) will be about 300°–500°F and is preferably about 325°–450°F, more preferably about 350°–425°F. It will be apparent from the data provided hereinafter that at temperatures much above 425°F the amount of by-products increases significantly.

The volumetric recycle ratio, i.e., the ratio of volumes of material recycled to volumes of fresh feed (5-o-tolylpentene-2) will normally be in the range of 1–50 and is preferably 5–20 more preferably about 10. The amount of recycle will be selected so as to keep the temperature rise in the reactor at an acceptable level. The maximum temperature in the reactor should never exceed 600°F, preferably does not exceed 500°F, more preferably does not exceed about 425°–450°F. The actual temperature rise will depend on the inlet feed temperature and the maximum reactor temperature permitted but will normally be less than 150°F, usually 100°F, and will preferably be not more than about 75°F. As the recycle ratio increases a larger reactor is necessary for constant production and as it decreases the dilution effect of the recycle decreases.

The liquid hourly space velocity in the reactor, in volumes of fresh feed per hour per volume of catalyst will usually be 0.01–5, preferably 0.05–1, and is more preferably about 0.2. It should be selected so that in combination with other variables the fresh feed conversion (the weight percentage of 5-o-tolylpentene-2 reacted) is at least 75 percent, preferably at least 90 percent, more preferably at least 95 percent, and the selectivity (weight percentage of reacted 5-o-tolylpentene-2 that forms 1,5- or 1,6-DMT) is at least 80 percent, preferably at least 85 percent, more preferably about 90 percent. The 1,6-DMT isomer is included in selectivity because as the aforesaid Thompson application shows it is readily converted to 2,6-DMN whereas other by-products are not.

It should be noted that the recycle ratio has the largest influence on reactor temperature rise. This is because the reaction will for economic reasons almost always be carried out at 95–100 percent conversion. Even though the heat generated may be reduced by, e.g., increasing the space rate it will only be a reduction of a percent or so and the effect on overall temperature rise is minimal. On the other hand variations in recycle ratio have a significant effect. A 10:1 recycle ratio will yield a reactor temperature rise on the order of 45°F whereas a 4:1 ratio will yield a rise on the order of 110°F.

The following examples illustrate the invention more specifically. Each example employs a one inch tube reactor filled with Universal Oil Products No. 2 Supported Phosphoric Acid catalyst. Feed and recycle are mixed and enter the reactor at the bottom at constant space rate. The reaction product is removed from the top and the portion thereof recycled is cooled.

In the examples the recycle is cooled to the same temperature as the fresh feed consequently the "feed temperature" in the table below is the temperature of each. The reactor temperature is at the outlet of the reactor.

The table below shows pertinent operating conditions, product analysis, conversion and selectivity.

TABLE

|  | Example 1 | Example 2 |
|---|---|---|
| Feed Temperature | 350 | 350 |
| Maximum Reactor Temperature | 395 | 460 |
| Recycle Ratio | 10 | 4 |
| Conversion | 98 | 99.9 |
| Selectivity | 91 | 88 |

The above data show that by cooling and recycling a portion of the reaction product the temperature in the reaction zone can be controlled.

The invention claimed is:

1. Method of preparing 1,5-dimethyltetralin (1,5-DMT) which comprises feeding 5-o-tolylpentene-2 into a fixed bed reactor containing an acidic cyclization catalyst at a temperature effective to cyclize the 5-o-tolylpentene-2 to 1,5-DMT, withdrawing reaction product containing 1,5-DMT from the reactor, cooling at least a portion of the withdrawn product, and recycling at least a portion of the cooled product to the reactor in an amount sufficient to control the reactor temperature at below 600°F.

2. Method according to claim 1 wherein the conversion of 5-o-tolylpentene-2 is at least 90 percent.

3. Method according to claim 1 wherein the amount of recycle is 5–20 volumes per volume of 5-o-tolylpentene-2 feed.

4. Method according to claim 1 wherein the amount of recycle is also sufficient to keep the temperature rise in the reactor at less than 100°F.

5. Method according to claim 4 wherein said rise is less than 75°F.

6. Method according to claim 1 wherein the temperature at the reactor inlet of the recycle-diluted feed is 350°–425°F.

7. Method according to claim 1 wherein the 1,5-DMT is thereafter converted to 2,6-dimethylnaphthalene.

* * * * *